(12) United States Patent
Sakurai

(10) Patent No.: US 7,595,071 B2
(45) Date of Patent: Sep. 29, 2009

(54) FISH PROCESSING METHOD USING SMOKING LIQUID INTO WHICH SMOKE-DRY COMPONENTS ARE DISSOLVED

(75) Inventor: Kenzo Sakurai, Nagaoka (JP)

(73) Assignee: Kabushiki Kaisha Onsui, Niigata (JP)

( * ) Notice: Subject to any disclaimer, the term of this patent is extended or adjusted under 35 U.S.C. 154(b) by 686 days.

(21) Appl. No.: 10/820,882

(22) Filed: Apr. 9, 2004

(65) Prior Publication Data

US 2005/0226959 A1 Oct. 13, 2005

(51) Int. Cl.
A22C 25/00 (2006.01)
A23L 1/325 (2006.01)

(52) U.S. Cl. ........................ 426/315; 426/643
(58) Field of Classification Search ................ 426/643, 426/315
See application file for complete search history.

(56) References Cited

U.S. PATENT DOCUMENTS

| | | | | |
|---|---|---|---|---|
| 2,670,295 A | * | 2/1954 | Ash | 426/643 |
| 3,480,446 A | * | 11/1969 | Hollenbeck | 426/602 |
| 3,503,760 A | * | 3/1970 | Allen | 426/312 |
| 3,901,981 A | * | 8/1975 | Draudt | 426/266 |
| 4,250,199 A | * | 2/1981 | Underwood et al. | 426/533 |
| 4,283,429 A | * | 8/1981 | Todd et al. | 426/250 |
| 4,285,981 A | * | 8/1981 | Todd et al. | 426/250 |
| 4,343,823 A | * | 8/1982 | Todd et al. | 426/250 |
| 4,359,481 A | * | 11/1982 | Smits et al. | 426/533 |
| 4,637,305 A | * | 1/1987 | Griffith et al. | 99/481 |
| 4,994,297 A | * | 2/1991 | Underwood et al. | 426/650 |
| 5,350,586 A | * | 9/1994 | Eckholm et al. | 426/105 |
| 5,637,339 A | * | 6/1997 | Moeller | 426/422 |
| 5,681,603 A | * | 10/1997 | Underwood | 426/271 |
| 6,010,726 A | * | 1/2000 | Evans et al. | 426/99 |
| 6,074,679 A | * | 6/2000 | Underwood | 426/135 |
| 2003/0134015 A1 | * | 7/2003 | Plaschke | 426/234 |
| 2003/0203085 A1 | * | 10/2003 | Naka et al. | 426/314 |

FOREIGN PATENT DOCUMENTS

| | | | |
|---|---|---|---|
| GB | 1137637 | * | 3/1968 |
| JP | 173677 | | 9/1946 |
| JP | 8-294357 A | | 11/1996 |
| JP | 08-298925 | * | 11/1996 |
| JP | 08-298925 A | | 11/1996 |
| JP | 08298925 | * | 11/1996 |
| JP | 9-149761 A | | 6/1997 |
| JP | 10-179016 A | | 7/1998 |
| JP | 2004-33014 A | | 2/2004 |

OTHER PUBLICATIONS

Komarik, S. et al. 1974. Food Products Formulary, vol. 1. The AVI Publishing Company, Inc., Westport, CT. p. 295-300.*

* cited by examiner

*Primary Examiner*—Carolyn A Paden
(74) *Attorney, Agent, or Firm*—Sughrue Mion, PLLC

(57) ABSTRACT

A fish processing method using a smoking liquid into which a smoke component is dissolved in which a so-called smoke-dry (smoke dry component) is liquefied and the smoking liquid is applied to the fish meat so that the product that is similar to that produced through a smoke dry process is produced with this liquid (smoking liquid), and it is possible to produce the product that is similar to that produced through the smoke dry process without performing the smoke-dry process in which the product should be brought into contact with gas. In addition, since not only the step for applying the flavor but also the smoke-dry components of the liquid and gas is contained in this smoking liquid, the same effect as that of the smoke dry process such as preservation is exhibited, with the smoking liquid which is easy to handle and superior in mass production, it is possible and easy to handle the smoke dried product which has been conventionally difficult to handle and has a disadvantage in mass production. A fish processing method using a smoking liquid into which a smoke dry component is dissolved is disclosed in which a smoking material from which at least one unnecessary substance such as soot and tar is removed is brought into contact with at least one of a water, a solution and a solution into which at least one necessary additive such as an antioxidant, a pH adjuster and a condiment so that the smoking liquid into which a smoking component is dissolved is applied to fish to produce a smoke dried product.

9 Claims, 2 Drawing Sheets

FISH PROCESSING METHOD USING SMOKING LIQUID INTO WHICH SMOKE-DRY COMPONENTS ARE DISSOLVED

BACKGROUND OF THE INVENTION

1. Field of the Invention

The present invention relates to a fish processing and preserving method in which smoke-dry components are dissolved in a solution to thereby make it possible to realize a smoke-dried and frozen product such as a cut fish, a yellowtail and an amberjack which are a medium size fish and a tuna fish which is a large size fish with high quality and high freshness.

2. Description of the Related Art

For example, a muscle property of a tuna fish is a reddish muscle fish as a whole (in which myoglobin protein pigments are dispersed in a whole body) unlike a yellowtail and other white muscle fish. If a tuna having a reddish muscle is preserved under a normal freezing and preserving condition under about −20° C., a brown change effect (methemoglobin change) spreads to a whole body muscle property as time lapses, as a result of which the color of the muscle turns almost brown or black after thawing. Although there is no problem at all in a nutritive value aspect or a sanitary or healthy aspect, the muscle is not suitable for a "sashimi" material (raw fish material) that is eaten through eyes. Accordingly, almost all the tuna fish which is landed is used for canned food.

A patent was obtained by Taiyo Gyogyo Co., Ltd (now Maruha Co., Ltd) in 1961 for a brown change effect (methemoglobin change) preventing method during freeze preserving. At that time it was a common sense in this business field that the color of the fish muscle turned black and brown at about 24° C. but it was found that when the temperature was further lowered down to −65° C., the fresh reddish color might be kept for a long period of time. Thus, a basic technology for eating a frozen tuna under the condition of "sashimi" was established. However, the color tone of the tuna muscle is very delicate and subject to change and it is impossible to suppress the change in the processed condition of fillet (loins) for a long period of time even at −60° C. For this reason, now, all the frozen and preserved tuna is handled in the form of a "round" product which is covered by a surface skin which is a natural protective film.

For this reason, in this business field, there is a demand for removing non-edible part which corresponds to two-thirds of the overall weight of the tuna to reduce the transporting cost but this has not been attained due to the above-described situation.

The tuna product was born as a frozen food because the tuna itself was expensive and Japanese stick the color tone of "sashimi". However, in order to handle the food under such a low temperature, it is a premise to consume a large amount of fossil energy (petroleum) for a freezing and preserving period. In Japan, recently, a super low temperature circulation system has been established and almost all the Japanese sashimi tuna is circulated through this circulation system. Recently, there is a demand of protection of circumstances and saving energy and some people are of the opinion that this system goes against the demand of saving energy, which is supported by the scientific society or the business field.

PROBLEMS TO BE SOLVED BY THE INVENTION

A smoked product produced by an old smoke-dry technology as one of the preservation technology brings about its effect through the contact and adsorption with the fish meat in the smoke (gas). Recently, an evaporation smoking liquid which is made of wood vinegar produced upon the smoke-dry process has been used for producing smoke-dry products. (For the sake of explanation, the conventional evaporation smoking liquid mainly for adding flavor will be described as a general smoking liquid and a solution liquid into which smoke dry components are dissolved according to the present invention will be referred to as a specific smoking liquid.)

However, in general evaluation, the smoke dry process is superior to the smoking liquid process and is preferred as a product. This is because the components of the smoke dry are different from those of the smoking liquid. From a manufacturing point of view, the reason why the smoking liquid process is introduced widely into the production field is that its handling is easy and it is suitable for mass-production.

A variety of the effects of the smoke dry are expected as described in Japanese Patent Application Laid-Open No. Hei 8-294357 filed by the present inventor. In contrast, the main purpose of the effect of the smoking liquid is to add the flavor. The reason for this is that the smoke dry components contain the components of solid, liquid and gas, whereas the components of the smoking liquid are mainly liquid components but contain almost no gas components.

In the case where the preservation which is the inherent purpose of the smoke dry is exhibited, the effect is brought about by the smoke dry process. The purpose of use of the smoking liquid is to add the flavor and the smoking liquid has almost no effect for reservation.

Namely, the smoke-dry processed product is superior to the smoking liquid processed product in reservation and product value. However, since the smoking liquid is superior in reservation, uniformity, workability and convenience in use, the smoking liquid is now used.

Therefore, if the smoke dry components (gas, liquid) may be brought into the liquid condition without any other process, it is possible to manufacture with the liquid (smoking liquid) the product that is similar to that produced through the smoke dry process and it is possible to produce by, for example, a simple dipping work without performing the difficult smoke dry process the product that is similar to that produced through smoke dry process.

According to the present invention, there is provided a fish processing method in which after soot or tar components that are unnecessary for the smoke-dried product are removed by a gas washing sleeve from the smoke generated by, for example, a smoke dry generation apparatus developed by the present inventor (Japanese Patent Application Laid-Open No. Hei 8-298925), the smoke dry components are dissolved into a solution into which necessary additives such as antioxidants, pH adjusters, condiments or the like under the condition that air is interrupted or air is not mixed thereinto and under the pressurized condition from the contact sleeve or a mixer or into a solution into which the additives are not dissolved to prepare the smoking liquid, and the fish meat is dipped thereinto or after the solid material is removed through a filter, the smoking liquid is used as a perfusate disclosed in, for example, Japanese Patent Application Laid-Open No. Hei 8-294357 by the present inventor so that the smoke dry components or food additives are dispersed into the fish meat to thereby produce the smoke-dry product.

With this technology, only by performing the dipping work, or by performing simultaneously the smoke dry process with the conventional perfusion process proposed by the inventor, it is possible to transport the tuna from the worldwide sites to Japan under the frozen condition at −18° C. without keeping the tuna in the round condition or only the edible part thereof at −60° C. or less. If such a process is effected, it is possible to reduce the consumed energy, which is needed to freeze or preserve the product, down to 1/80 and an extremely remarkable energy saving may be expected.

SUMMARY OF THE INVENTION

The essence of the invention will now be described with the accompanying drawings.

According to a first aspect of the invention, there is provided a fish processing method using a smoking liquid into which a smoke dry component is dissolved is characterized in that a smoking material from which at least one unnecessary substance selected from the group essentially consisting of soot and tar is brought into contact with at least one of a water, a solution and a solution into which at least one necessary additive selected from the group essentially consisting of an antioxidant, a pH adjuster and a condiment so that the smoking liquid into which a smoking component is dissolved is applied to fish to produce a smoke dried product.

Also, according to a second aspect of the invention, the fish processing method using the smoking liquid into which the smoke dry component is dissolved as described in the first aspect is further characterized in that a skinless cut fillet is dipped in the smoking liquid to thereby apply the smoking liquid to the fillet.

Also, according to a third aspect of the invention, the fish processing method using the smoking liquid into which the smoke dry component is dissolved as defined in the first aspect, is further characterized in that the smoking liquid is dispersed into fish meat through a blood vessel as a perfusate to thereby apply the smoking liquid to the fish meat.

Also, according to a fourth aspect of the invention, the fish processing method using the smoking liquid into which the smoke dry component is dissolved as defined in the third aspect of the invention, is further characterized in that after the smoking liquid is caused to pass through a filter to thereby remove a fine solid substance, the smoking liquid is used as a perfusate and dispersed into a fish meat to apply the smoking liquid to the fish meat.

Also, according to a fifth aspect of the invention, the fish processing method using the smoking liquid into which the smoke dry component is dissolved as defined in the third aspect of the invention, is further characterized in that the smoking component is dispersed into a meat of a large size fish under a round condition such as a tuna and a sward fish.

Also, according to a sixth aspect of the invention, the fish processing method using the smoking liquid into which the smoke dry component is dissolved as defined in the fourth aspect of the invention, is further characterized in that the smoking component is dispersed into a meat of a large size fish under a round condition such as a tuna and a sward fish.

Also, according to a seventh aspect of the invention, the fish processing method using the smoking liquid into which the smoke dry component is dissolved as defined in any one of the first to sixth aspects of the invention, is further characterized in that the smoking material generated from a smoke generating device and from which at least one unnecessary substance selected from the group essentially consisting of soot and tar is removed under a condition where an air is interrupted or an air is not introduced is brought into contact at a normal pressure and/or a pressurized condition or into mixing contact by a mixer with at least one of a water, a solution and a solution into which at least one necessary additive selected from the group essentially consisting of an antioxidant, a pH adjuster and a condiment to dissolve the smoking component to form the smoking liquid to thereby applying the smoking liquid to fish to produce a smoke dried product.

Also, according to an eighth aspect of the invention, the fish processing method using the smoking liquid into which the smoke dry component is dissolved as defined in any one of the third to sixth aspects of the invention, is further characterized in that after a first perfusate containing a component that prevent the blood from coagulating for flowing a blood through a blood vessel of the fish is pressurized to flow out and discharge the blood, the smoking liquid is dispersed, as the perfusate to be fed thereafter, into a fish meat through the blood vessel to thereby apply the smoking component over the fish meat to produce a smoke dried product.

Also, according to a ninth aspect of the invention, the fish processing method using the smoking liquid into which the smoke dry component is dissolved as defined in the seventh aspect, is further characterized in that after a first perfusate containing a component that prevent the blood from coagulating for flowing a blood through a blood vessel of the fish is pressurized to flow out and discharge the blood, the smoking liquid is dispersed, as the perfusate to be fed thereafter, into a fish meat through the blood vessel to thereby apply the smoking component over the fish meat to produce a smoke dried product.

Also, according to a tenth aspect of the invention, the fish processing method using the smoking liquid into which the smoke dry component is dissolved as defined in the eighth aspect, is further characterized in that after a first perfusate containing a component that prevent the blood from coagulating for flowing a blood through a blood vessel of the fish is pressurized to flow out and discharge the blood, the smoking liquid containing a component in conformity with a purpose of anti-oxidation and taste improvement is dispersed, as a second perfusate, into a fish meat through the blood vessel to thereby apply the smoking component over the fish meat to produce a smoke dried product.

Also, according to an eleventh aspect of the invention, the fish processing method using the smoking liquid into which the smoke dry component is dissolved as defined in the ninth aspect, is further characterized in that after a first perfusate containing a component that prevent the blood from coagulating for flowing a blood through a blood vessel of the fish is pressurized to flow out and discharge the blood, the smoking liquid containing a component in conformity with a purpose of anti-oxidation and taste improvement is dispersed, as a second perfusate, into a fish meat through the blood vessel to thereby apply the smoking component over the fish meat to produce a smoke dried product.

According to a twelfth aspect of the invention, the fish processing method using the smoking liquid into which the smoke dry component is dissolved as defined in any one of the first to sixth aspects of the invention, is further characterized in that the smoke dried product to which the smoking liquid is applied is frozen.

According to a thirteenth aspect of the invention, the fish processing method using the smoking liquid into which the smoke dry component is dissolved as defined in the seventh aspect, is further characterized in that the smoke dried product to which the smoking liquid is applied is frozen.

According to a fourteenth aspect of the invention, the fish processing method using the smoking liquid into which the smoke dry component is dissolved as defined in the eighth aspect, is further characterized in that the smoke dried product to which the smoking liquid is applied is frozen.

According to a fifteenth aspect of the invention, the fish processing method using the smoking liquid into which the smoke dry component is dissolved as defined in the ninth aspect, is further characterized in that the smoke dried product to which the smoking liquid is applied is frozen.

According to a sixteenth aspect of the invention, the fish processing method using the smoking liquid into which the smoke dry component is dissolved as defined in the tenth aspect, is further characterized in that the smoke dried product to which the smoking liquid is applied is frozen.

According to a seventeenth aspect of the invention, the fish processing method using the smoking liquid into which the smoke dry component is dissolved as defined in the eleventh aspect, is further characterized in that the smoke dried product to which the smoking liquid is applied is frozen.

MODE FOR EMBODYING THE INVENTION

A mode for embodying the invention (how to embody the invention) which is preferred will now be described with reference to the accompanying drawings together with its resultant effect.

According to the present invention, unnecessary material such as soot or tar is removed from smoke generated from, for example, a smoke generating device, under the condition that air is interrupted or air is not introduced, and agitated and brought under a room pressure or a pressurized condition into contact with a water or a solution or a solution into which necessary material such as an antioxidant, a pH adjuster and a condiment is dissolved to dissolve smoke-dry components to form a smoking liquid, and a skinless cut fillet is dipped into the smoking liquid to be subjected to the smoking liquid or the smoking liquid is used as a perfusate to be dispersed into the muscle through a blood vessel to apply the smoking liquid to produce a smoked product.

Namely, the so-called smoke-dry (smoke dry component) is liquefied so that the product that is similar to that produced through a smoke dry process is produced with this liquid (smoking liquid), and it is possible to produce the product that is similar to that produced through the smoke dry process without performing the smoke-dry process in which the product should be brought into contact with gas. In addition, since not only the step for applying the flavor but also the smoke-dry components of the liquid and gas is contained in this smoking liquid, the same effect as that of the smoke dry process such as preservation is exhibited, with the smoking liquid which is easy to handle and superior in mass production, it is possible and easy to handle the smoke dried product which has been conventionally difficult to handle and has a disadvantage in mass production. Namely, since the smoke dry components are applied by the smoking liquid as described above to produce the smoked product, it is sufficient to dip the material into the smoking liquid, and also, as described in, for example, Japanese Patent Application Laid-Open No. Hei 8-294357, it is possible to easily disperse the smoking liquid into the muscle as the perfusate.

For example, in order to cause the blood containing components, which do not coagulate the blood, to flow out through the blood vessel of fish, a first perfusate has been fed under a pressure to cause the blood to flow out, and thereafter, as a second perfusate, it is possible to disperse through the blood vessel the above-described smoking liquid or a smoking liquid containing the components selected to meet the purpose such as anti-oxidation or taste improvement to apply the smoke components to the muscle to produce the smoked product. It is possible to disperse sufficiently extensively additives to the food with ease together with the smoke-dry components. The perfusion process and the smoke-dry process may be performed simultaneously, which is extremely superior in practical use.

Also, these processes may be performed in a "round" condition or in a fillet (strip piece).

Also, if the product produced through these processes is frozen after the process, it is possible to prevent the brown change effect (methemoglobin change) even without the super freezing at −60° C. and it is possible to considerably reduce the transportation cost. Also, it is unnecessary to transport the material in the "round" condition to thereby make it possible to further decrease the transportation cost and to save the energy.

DESCRIPTION OF THE PREFERRED EMBODIMENTS

A specific embodiment of the present invention will now be described with reference to the accompanying drawings.

According to the embodiment, material that is unnecessary to produce the smoked product, such as soot or tar, has been removed from smoke generated from a smoke generating device (Japanese Patent Application Laid-Open No. Hei 8-298925) by a washing sleeve, under the condition that air is interrupted or air is not introduced, and thereafter, the smoke dray components are dissolved by a contact sleeve under a mixer condition, a room pressure or a pressurized condition into contact with a solution into which necessary material such as an antidant, a pH adjuster and a condiment is dissolved or not dissolved to produce the smoking liquid. In the first embodiment, the smoking liquid is caused to pass through a filter to remove fine solid material and used as a perfusate defined in Japanese Patent Application Laid-Open No. Hei 8-294357 to thereby disperse smoke dry components or food additives into the muscle to produce the smoked product. Namely, after the smoke filter is caused to pass through the filter and the fine solid material is removed, the liquid is used as the perfusate to disperse the smoke dry components or the food additives into the muscle under the "round" condition of a large size fish such as a tuna (a blue-fin tuna, a South Indian Current tuna, a yellow-fin tuna, a big-eyed tuna or black rockfish) or a swordfish to produce the smoked product.

Also, in a second embodiment, a skinless cut fillet is dipped in a smoking liquid to produce a smoked product. The respective embodiments will now be described in more detail.

1. Perfusion Device

Figure 1:
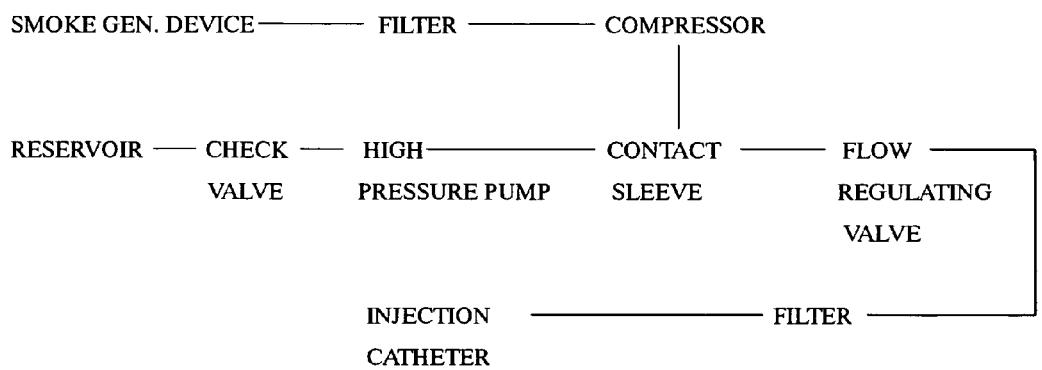
FIG. 1 is a schematic structural view of a first embodiment of the invention.

First Embodiment (1) Overall Structure (FIG. 1)

The overall structure is as follows. A discharge outlet of a reservoir into which a water-soluble antioxidant and a pH adjuster are dissolved in a clean water and a water sucking port of a high pressure pump are connected to each other through a check valve, and a discharge outlet of the high pressure pump and an upper portion of a contact sleeve are connected to each other so that a water tube liquid within the reservoir is poured from an upper portion of the contact sleeve by means of the pump.

A contact material is sealed in the contact sleeve, and the water solution filled by the pump gathers to a lower portion of the contact sleeve through the contact material.

On the other hand, the dry-smoke produced by a dry-smoke generating device is caused to pass through a simple filter to remove soot or tar, and thereafter is pressurized and fed from the lower portion of the contact sleeve by means of a compressor.

A liquid surface regulating pressure valve is provided within the contact sleeve for adjusting the water level so that the water surface of the lower portion thereof is not varied. Furthermore, a pressure valve for discharging the fed dry-smoke is mounted on the upper portion of the contact sleeve so that the dry-smoke is always fed or discharged in the operation and a concentration of a dry-smoke composition within the contact sleeve is kept constant. The balance between the water pressure and the atmospheric pressure may be adjusted by the pressure within the contact sleeve as desired.

The valve for regulating the pressure is mounted on the contact sleeve to regulate the pressure within the contact sleeve. The solution is introduced into the filter housing from the contact sleeve and caused to pass through the filter having a pore diameter of 0.3 μm to prevent fine blood vessel clogging causing materials and microbes from being mixed thereinto.

The solution (smoking liquid) through the above-described process is introduced into a catheter for injection and inserted into artery globes of living fish to thereby perform the perfusion process.

(2) Use Example

The fish kept under an apparent death condition is cut and opened to expose a heart. The catheter through which a slight amount of the perfusate flows is inserted into the ventricle of the heart so that the perfusate flows into the artery globes. The position of the catheter is fixed by clips or forceps and thereafter a sinus venosus is cut and opened. A suitable amount of the perfusate corresponding to a weight of the fish is fed by the valve adjustment. This process is finished for a predetermined period of time.

Also, the system having the above-described structure may be assembled into the perfusion device described in Japanese Patent Application Laid-Open No. Hei 10-179016 and used.

The first perfusate for causing the blood, containing a component that prevents the blood from coagulating, is fed under pressure through blood vessels of the fish to cause the blood to flow out, and thereafter, the above-described smoking liquid may be dispersed into the muscle through the blood vessels as the perfusate to be fed later.

Also, in this case, it is possible to dissolve in the smoking liquid necessary additives such as antioxidant, pH adjuster and condiment in advance as described above. After the first perfusate for causing the blood, containing the component that prevents the blood from coagulating is fed under pressure, to flow out is caused to flow out through the blood vessels of the fish, the above-described smoking liquid containing the component corresponding to the purpose such as anti-oxidation or improvement in taste as the second perfusate may be dispersed in the muscle through the blood vessel.

2. Dipping Device

Figure 2:
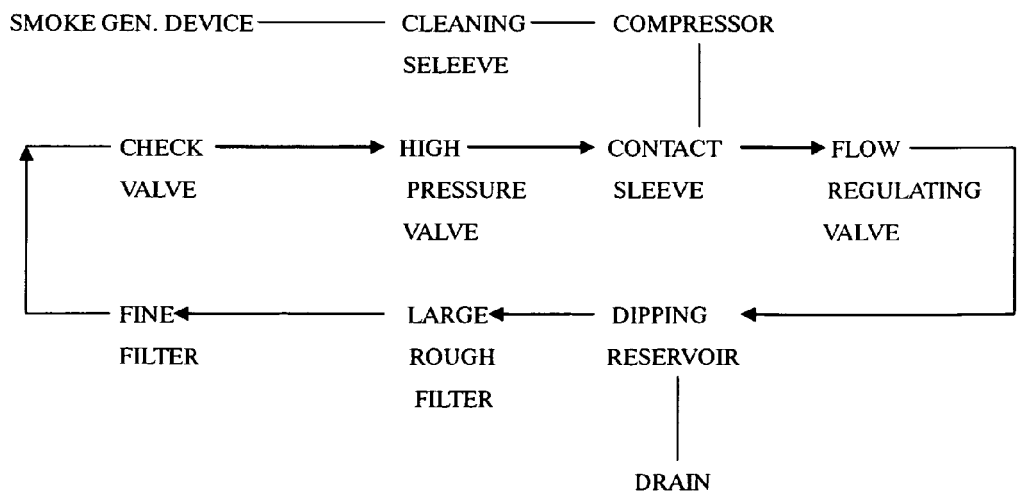
FIG. 2 is a schematic structural view of a second embodiment of the invention.

Second Embodiment (1) Overall Structure (FIG. 2)

The structure is as follows. Rough dust is removed by a rough filter (pore diameter of about 200 μm) from a discharge outlet of a dipping reservoir into which a water-soluble antioxidant or a pH adjuster is dissolved in a clean water. Thereafter, the liquid is caused to pass through a fine filtration filter (pore diameter of about 0.3 μm) to perform the microbe removal. Thereafter, a check valve is connected to a water sucking port of a high pressure pump. The discharge port thereof is connected to an upper portion of a contact sleeve. A water tube liquid within the reservoir is fed from an upper portion of the contact sleeve by the pump.

A contact material is fed and sealed in the interior of the contact sleeve. The solution fed by the pump moves along the contact material and gathers to the lower portion of the contact sleeve.

The dry smoke produced by the dry smoke producing device is caused to pass through a simple filter so that the tar or soot is removed. Thereafter, the dry smoke is fed under pressure from the lower portion of the contact sleeve by a compressor.

A liquid surface regulating pressure valve is provided within the contact sleeve for adjusting the water level so that the water surface of the lower portion thereof is not varied. Furthermore, a pressure valve for discharging the fed dry-smoke is mounted on the upper portion of the contact sleeve so that the dry-smoke is always fed or discharged in the operation and a concentration of a dry-smoke composition within the contact sleeve is kept constant. The balance between the water pressure and the atmospheric pressure may be adjusted by the pressure within the contact sleeve as desired.

The valve for regulating the pressure is mounted on the contact sleeve to regulate the pressure within the contact sleeve. Thereafter, the solution is returned back to the dipping reservoir.

(2) Use Example

The fillet processed fish is dipped for a predetermined period of time into the dipping reservoir for recirculating the dry smoke dissolved liquid (smoking liquid) by the pump to finish the dry smoke process.

3. Effect to Product

The processing method according to the present invention may be applied not only to a yellowtail or an amberjack described in the above-described Japanese Patent Application Laid-Open No. Hei 10-179016 but also to a large size fish such as a tuna or a fillet processed skinless fish meat regardless a kind of fish. The effect was as follows.

(1) Test I, Yellowtail ("hamachi")

Sensitive Test between Test Region (dry smoke dissolving and perfusion process) and Comparative Region (non-processed region)

Preserving Test Result within Refrigerator

Lapse

Lapse Day Zero

With respect to the fish meat quality of the processed and cut loin, the reddish meat turned somewhat bright tone in comparison with that of the comparison region.

Lapse Day One

The fade of color started in the comparison region and the soft taste was felt (edible limit).

The tone of the test region was unchanged. The taste was a little bit soft.

There was neither a taste nor a smell in both regions.

Lapse Day Two

The comparison region had completely changed brown after two full days. The fruity smell was strongly felt. When it was eaten, a soft feeling and a special sticky feeling were left in a mouth (non-edible).

The tone and the taste of the test region were normal but the eating touch (hardness) was degraded (edible).

Lapse Day Three

The outer appearance of the comparison region was unchanged like that of the previous day but the fruity smell become stronger.

The tone and the taste of the test region were degraded in comparison with those of the previous day but no smell was not present (edible limit).

Result

The change of the tone, the hardness and the taste of the test region was delayed in comparison with the comparison region. The edible limit was extended one day and the test region might be eaten as a commercial "sashimi" product. Thereafter, the value of the commercial product was degraded but the surface dry condition was accelerated and the tone was primarily changed. The comparison region was subjected to the methemoglobin change in one day but the test region was not subjected to the methemoglobin change in the day three. The presence of the abnormal taste and the abnormal smell that were peculiar to the yellowtail ("hamachi") was considerably delayed. The effect of a series of the process was confirmed.

(2) Test II, Yellowtail

The above-described comparison region of the day zero was rapidly frozen. The comparison was made with the conventional product (Japanese Patent Application Laid-Open No. Hei 10-179016).

TABLE 1

Reference Region: Conventional product (A non-processed product could not be frozen.)
Test Region: Test product (Smoke-dry dissolved perfusion process)
(The day 0 was set after the rapid defrost, and the product was preserved in a refrigerator.)

| lapse | tone | taste | feel in eating | smell |
|---|---|---|---|---|
| Day 0 | | | | |
| Test region | Warm red color | Thick and heavy | The best | None |
| Ref. region | Cold red color | Thick and heavy | The best | None |
| Day 1 | | | | |
| Test region | Somewhat faded out | Somewhat degraded | Good | None |
| Ref. region | Somewhat faded out | Somewhat degraded | Good | None |

TABLE 1-continued

Reference Region: Conventional product (A non-processed product could not be frozen.)
Test Region: Test product (Smoke-dry dissolved perfusion process)
(The day 0 was set after the rapid defrost, and the product was preserved in a refrigerator.)

| lapse | tone | taste | feel in eating | smell |
|---|---|---|---|---|
| Day 2 | | | | |
| Test region | Faded out | Degraded | Soft | None |
| Ref. region | Faded out | Degraded | Soft | None |
| | The taste was good but the product value was degraded in the aspect of the softness. | | | |
| Day 3 | | | | |
| Test region | Further faded out | Further degraded | Further soft | Somewhat fruity smell |
| Ref. region | Further faded out | Further degraded | Further soft | Somewhat fruity smell |
| | Both feeling in eating and the taste were degraded in comparison with those in the previous day and the softness was further accelerated. | | | |

Result

The best period was a full one day both in the test region and the comparison region. However, the change was slow. The edible period might be about day three. The tone of the conventional dry smoke process was different from the tone of the test region. However, its reason was unknown.

(3) Result of Test I and Test II, Yellowtail

The test region of the fresh fish was best in change in tone. The test region and the comparison region of the frozen product was the second best. This would be because the frozen product had the difference in discharge of moisture due to the freeze damage in comparison with the fresh fish.

However, the difference was apparent in the methemoglobin change rate in tone. The rate of all the dry smoke products was about 20% in day three but the rate of the comparison region of the fresh fish was not less than 80%, which meant the remarkable methemoglobin change (brown change).

Because the taste of the fresh fish was mainly composed of inosine acid, the degradation was remarkable in the day three. Also, in the frozen product, the degradation of the taste occurred in one day and half a day. This change was considered not to have any direct relation to the formation of inosine acid, decomposition thereof or the dry smoke process, i.e., to have nothing to do with the decomposition of ATP. However, the test region was superior in eating feel but the reason why was unknown.

The comparison region was remarkable in smell adsorption of the fresh fish. The fruity smell occurred in the second day. Since in case of the yellowtail, the smell occurred mainly in a dark-colored flesh, this would be caused by the smell generation due to the enzyme composition rather than the smell generation due to the microbes. The series of process has a high effect for preventing the generation of the smell.

Incidentally, the freshness was good at about 25% in the final day in terms of freshness coefficient K value (%) in any of the respective test and comparison regions during the test period.

Change of Refrigerated Product and Frozen Product of Dry Smoke Perfusion Processed Products i) The dry smoke perfusion process was applied to the living blue-fin tune. In the form of a loin block, the test of refrigeration and preservation (air contact condition and block piece evacuated pack) was conducted. Then, the change in the acid rotten smell and the tone was reviewed.

ii) Furthermore, the same tune was frozen at −18° C. in the form of a loin block piece and had been defrosted after a lapse of thirty days. Thereafter, the change was examined. However, this was not applied to the comparison regions.

TABLE 2

Lapse in test 1

| Day | |
|---|---|
| Day 0 | Transported with ice after perfusion process |
| Day 2 | The "round" portion was cut into blocks with dark colored flesh. A piece of a back portion was observed. The flesh exhibited a dark violet color and showed the non-oxygen condition. There was no smell. |
| Day 3 | The surface of the dark colored flesh exhibited a color. There was no smell. The taste was good. |
| Day 4 | The surface of the dark colored flesh turned dark. The cross-section of the dark colored flesh turned red. The color of the edible portion was good. There was no smell. The taste was better. |
| Day 5 | The surface of the dark colored flesh turned dark. The cross-section of the dark colored flesh turned red. The color of the edible portion was good. There was no smell. The taste was the best. |
| Day 6 | The surface of the dark colored flesh turned dark. The cross-section of the dark colored flesh turned red. The color of the edible portion was good. There was no smell. The taste was somewhat degraded but good. |
| Day 7 | The surface of the dark colored flesh turned dark. The cross-section of the dark colored flesh turned red. The color of the edible portion was good. There was no smell. The taste was further degraded but good. |
| Day 8 | The portion which was in contact with air turned somewhat dark. The tone was fresh. There was no smell. The cross-section of the dark colored flesh turned reddish. The taste of tuna was degraded but good. |
| Day 9 | The portion which was in contact with air turned dark as a whole but the cross-section was fresh. There was no smell. The cross-section of the dark colored flesh turned reddish. The taste of tune was further degraded. |
| Day 10 | The dark color was accelerated down to about 7 mm from the surface of the portion which was in contact with air. However, the inner portion of the cross-section was a little bit dark but fresh. The taste of the tuna was lost but was good as a "sashimi". There was no smell. The color of the portion near to the skin did not change. |

Lapse in Test 2

On the day 30, the portion which had been loosely frozen was sealed in a petri dish with ice water kept at 0° C. after the preservation at −18° C. and after a defrost film was opened. The portion was preserved in a refrigerator at 6° C.

| Lapse date after defrost | Tone | Feel in eating | Taste in eating | Smell | pH | Methemo-globin Rate |
|---|---|---|---|---|---|---|
| Day 0 | Somewhat degraded | Somewhat hard | Thick and heavy | none | 5.45 | 44 |
| Day 1 | Somewhat degraded | Somewhat good | Thick and heavy | none | 5.43 | 49 |
| Day 2 | Somewhat degraded | Somewhat soft | Somewhat faded out | none | 5.61 | 57 |
| Day 3 | Somewhat degraded | Soft | Degraded | Fruity smell | 5.96 | 55 |
| Day 4 | Degraded | Soft | Further degraded | From fruity smell to rotten smell | 6.21 | 67 |

Evaluation 1

The oil containing rate of a bred tuna and a cultivated tuna was conventionally high in comparison with a natural tuna and therefore, the oil rich problem (oxidation smell) was encountered. The oxidation smell was felt on the third day after cutting.

According to the present test result, the fish was transported in the form of the "round" condition after the perfusion process to spend two full days and there had not been the acid rotting smell at all for eight days after the air contact after the cutting fish apart. Also, there had been neither fruity smell nor rotting smell during the same period at all. Furthermore, under the condition that the block pieces were interrupted from the air, the methemoglobin change had not occurred at all for the test period. The color exhibition due to the air contact started in about one day after cutting the fish apart. In the conventional tuna block, the methemoglobin change started in the central portion of the flesh or a portion close to the skin. However, it should be noted that there was no methemoglobin change at all from the interior of the present processed product.

Evaluation 2

The fade of the color was accelerated even after the lapse of thirty days but the fresh reddish color was kept, which was the slow freeze. The tone of the tune was stable in comparison with a kind of the yellowtail. However, the methemoglobin change had occurred in a short period of time due to the normal freeze of the tuna or the preservation temperature thereof. The taste of the tuna was heavy on the day zero and the day one in a taste aspect in the test II, and the phenomenon of the removal of the taste thereafter substantially corresponded to the fifth day of the refrigeration test. In the freeze test, the regions of the day three after defrosting was not visually faded in color in a petri dish. The smell was felt on the third day. The smell was changed into the rotting smell on the fourth day. Therefore, it is inferred that the number of bacteria was large in the test II.

It was confirmed that the frozen product after the perfusion process was frozen and preserved at −18° C. and the product might be used as a "sashimi" material after thirty days.

Accordingly, it was possible to enhance the preservation by the improvement in the manufacturing process.

TABLE 3

Tilapia
Feeling test after preservation, in a refrigerator, of the rapid defrosted product after one month lapse of the rapid defrosted product immediately after the process for the test region (smoke dray solution dipping process of fillet) and the reference region (no process)

| Lapse date | tone | Softness | Taste in eating | Smell |
|---|---|---|---|---|
| Day 0 | | | | |
| Test region | Good | Good | Extremely good | None |
| Ref. region | Dark | Good | Good | None |
| Day 1 | | | | |
| Test region | Good | Good | Good | None |
| Ref. region | | Good | Somewhat degraded. | None |
| Day 2 | | | | |
| Test region | Somewhat degraded | Somewhat soft | Somewhat degraded | None |
| Ref. region | | soft | Somewhat degraded and non-taste | Fruity smell |
| Day 3 | | | | |
| Test region | Further degraded | Somewhat soft | Somewhat degraded | None |
| Ref. region | | Accelerated | No-taste | Strong fruity smell |

Result

If the test region was in the preservation case in which the humidity is kept at a suitable range even in the stage after the third day, it was considered that the commercial value was kept sufficiently. Only according to the tone, the test region might maintain the commercial value for three days or more. However, in the comparison region, the methemoglobin change had been accelerated in the frozen condition and the commercial value had been lost before defrost. Also, with respect to the generation of smell, there had not been no smell for three days or more in the test region but there was the smell after the day two onward after defrost. As a result, the dry smoking liquid dipping effect contributed not only the tone but also the prolongation of the taste and the eating feel.

Summary of the Test Result

As a result of the above-described tests, it was confirmed that the improvement in preservation of each fish that had been processed and manufactured with the dry smoke through the dry smoking was expected with excellent tone and taste. These effects were exhibited also during the freeze preservation. Also, it was confirmed that the preservation effect of the tone aspect during the freezing process was the same as that of the conventional case.

Therefore, the effect of the dry smoke process (i.e., the effect of applying the dry smoke) was regarded as follows:

i) Applying special fragrance and flavor ii) Coloring of edible meat and stabilization of meat color iii) Effect of anti-oxidation of fat iv) Preventing the increase of microbe in meat v) Acceleration of self digestion of meat vi) Dry effect (reduction of moisture activity)

vii) Permeation and adsorption of antibacterial substance due to dry smoke component viii) Pasteurizing effect (in case of the situation of 40° C. or more)

The same effects as those were exhibited by the process using the smoking liquid according to the embodiment.

However, the similar effects to those effects would be exhibited by the process using the smoking liquid according to the embodiment.

In the present embodiment, the exhibition of the above-described effects is due to the liquefaction of the smoke dry component and the perfusion process under the condition that fine bubble is not generated in the smoking liquid into which the smoke component is liquefied.

When the perfusion process is performed, if the fine bubble is present in the perfusate, the blood vessel is clogged by the fine bubble so that the perfusion process is disabled. Incidentally, in general, a diameter of the fine blood vessel is in the order of several microns, whereas a diameter of the fine bubble is about 10 microns so that the blood vessel is clogged when the fine bubble is generated within the blood vessel.

Namely, the smoke component may be regarded as the mixture gas containing an extremely large number of components.

These components have the proper solubility to the water. Almost all the gas except for a specific gas (for example, carbon dioxide or the like) follows Law of Henry.

Thus, the solution into which the gas is dissolved is brought into a saturated condition due to the reduction of pressure, the increase of the temperature and solute other than the smoke dry component. The gas that has not been dissolved becomes bubble by the solution.

Namely, this fine bubble might be generated due to the difference between the temperature of the perfusate and the temperature of the fish body, the change of the solubility of the solid substance and the change in pressure. When this fine bubble is generated, the blood vessel is clogged to that it is impossible to complete the perfusion process as described above.

In this respect, according to the embodiment, the pressurized and saturated liquid is kept under a normal pressure by the follow regulating valve shown in FIG. 1. Furthermore, the generated fine bubble is separated by the filter. Furthermore, the fine solid substance is removed. Thus, the adjusted perfusate is used.

For this reason, it is possible to complete the perfusion process by the perfusate which does not contain the fine bubble. Accordingly, it is possible to permeate the smoke dry component into the fish body by the perfusion process without causing the blood blockade.

Also, the effect of the smoking liquid is to cause the dissolved smoke dry component to adsorb onto the foods. Therefore, it is sufficient to adjust the solubility in conformity with the use. For example, it is possible to use the smoking liquid dissolved for a short period of time at a high temperature or the liquid into which the smoke is saturated at a normal pressure while it takes long time to dissolve the smoke. Also, the pressure of the fish body is elevated within a pressure container so that the perfusate having the solubility that could not be obtained at a normal temperature may be used. In this case, the fish body is subjected to the perfusion process under the circumstances at a normal pressure. Furthermore, this fish body is received in the pressure container. The pressure within this pressure container is elevated by the air or the smoke. At the same time, the pressure within the dissolving sleeve is elevated. It is recommended to feed the perfusate having the solubility in the range where the fine bubble is not generated under the same pressure as that of the fish meat.

In the case of the dipping process of the fish other than the perfusion process, as shown in FIG. 2, since it is unnecessary to take account of the affect of the blood vessel blockage due to the saturation, it is possible to increase the pressure in the dissolving reservoir and to reduce the pressure by providing the flow rate regulating valve between the dissolving reservoir and the dipping reservoir. In this case, the smoke component dissolved in the dissolving sleeve is oversaturated at the time the component passes through the flow rate regulating valve. In this case, it is possible to accelerate the dipping permeation by sealing the dipping reservoir into a pressure reservoir structure. Thus, it is possible to shorten the dipping processing time.

Figure 3:
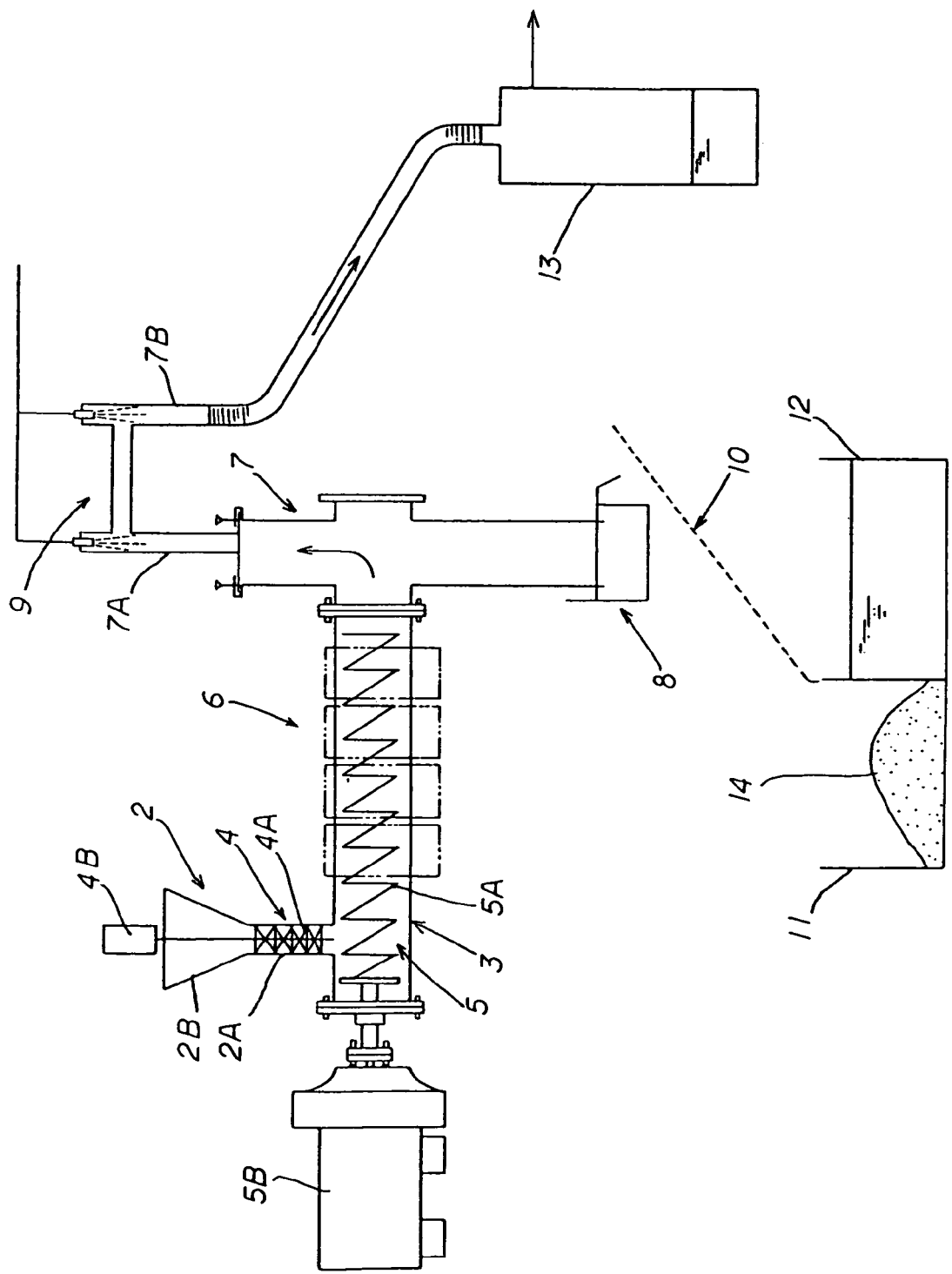
FIG. 3 is a schematic structural view of a smoke generating apparatus according to an embodiment of the invention.

Incidentally, the smoke dry generating apparatus (Japanese Patent Application Laid-Open No. Hei 8-298925) will be described with reference to FIG. 3.

Namely, in the embodiment, a so-called dissolved smoke that is unsaturated and contains no fine bubble at all is used as a perfusate. Also, the introduction of gas is prevented by a flow rate regulating valve and a separation filter to thereby exhibit the above-described effects well.

A delivery tubular path 3 which may move a smoke material such as wood chips cast and fed from a cast portion 2 is integrally formed with the cast portion 2. An atmospheric air introduction suppressing mechanism 4 composed of a screw 4A, a rotor and the like by which an atmospheric air is hardly introduced into the delivery tubular path 3 from the cast portion 2 is provided in the cast portion 2. An agitating transferring mechanism 5 such as a feed screw 5A for agitating and feeding the smoke material fed from the cast portion 2 into the above-described delivery tubular path 3. A heating portion 6 for heating the smoke material and controlling the temperature of the smoke material that is agitated and transferred is provided in the delivery tubular path 3. A smoke discharge path 7 is integrally formed at a terminal end of the delivery tubular path 3. A receiving portion 8 is provided for receiving the solid substance or the liquid falling from the terminal end of the delivery tubular path 3. The smoke is discharged and generated from the smoke discharge path 7.

A discharge path cleaning mechanism 9 for injecting an injection flow such as a water flow or a water steam flow to be injected toward the receiving portion 8 is provided in the smoke discharge path 7 for generating and feeding the smoke from the smoke discharge path 7.

In the smoke generating apparatus, the cast portion 2 is provided with a hopper 2B at an upper end of a vertical lead tube 2A, and a feed screw 4A that is rotated by a motor 4B is provided within the vertical lead tube 2A to form an atmospheric air flow entraining suppressing mechanism 4 with the delivery tubular path 3 integrally with the lower portion of the vertical lead tube 2A.

Therefore, the smoke material to be cast to the hopper 2B is fed into the delivery tubular path 3 by the feed screw 4A. It should be however noted that this is not a simple structure where the smoke material is cast to drop through the vertical lead tube 2A but the structure where the atmospheric air is hardly entrained into the delivery tubular path 3 because the smoke material is fed by the feed screw 4A.

The feed screw 5A that is rotated by a motor 5B is provided in the delivery tubular path 3 as an agitating transferring mechanism 5 so that the smoke material fed from the cast portion 2 is transferred on the side of the terminal end while being agitated by the feed screw 5A.

In the embodiment, band heaters are provided as the heating portion 6 on the way of the delivery tubular path 3 and the temperature of this heater is controlled.

Accordingly, this structure is of a dry distillation type with the sealed structure into which no air is introduced from the cast portion 2. The smoke material to be fed is heated a plurality of band heaters whose temperature is controlled respectively in several stages in a suitable temperature range so that a high quality smoke dry-distilled and having a small amount of oxidants may be generated without burning.

In addition, although this system is of the dry distillation, the smoke material to be transferred along and on the bottom of the delivery tubular path 3 is transferred while being agitated by the feed screw 5A and heated. Accordingly, the smoke material is heated at a suitable temperature uniformly and heat-decomposed without using any heat source for burning so that a large amount of smoke with a high quality may be continuously generated.

The smoke discharge path 7 is integrally formed at the terminal end of the delivery tubular path 3 under the sealed condition so that the atmospheric air is not entrained into the heating portion 6. The receiving portion 8 for receiving the liquid components (tar components) and the solid components (charcoal) falling from the terminal end of the delivery tubular path 3 is provided on the lower bottom portion thereof. In the embodiment, a water tank is provided as the receiving portion 8, and the discharged liquid overflowed from the water tank is caused to move along a separation strainer plate 10 (punched metal plate) and waste powder 14 (mainly composed of carbon) is received in a discharge tank 11, whereas the moisture is received in a reservoir 12.

A discharge gas lead portion 7A is provided on the top portion of the above-described smoke discharge path 7 and a discharge gas lead portion 7B for leading the discharge gas into a receiving reservoir 13 branched from the discharge gas lead portion 7A is provided so that the smoke generated within the delivery tubular path 3 is discharged to the outside through the discharge gas lead portion 7A and the discharge gas lead portion 7B of the smoke discharge path 7.

In the embodiment, the discharge path cleaning mechanism 9 for injecting cleaning water to the receiving portion 8 and the receiving reservoir 13, respectively, is provided at the discharge gas lead portion 7A and the discharge gas lead portion 7B of the smoke discharge path 7 to always perform the cleaning operation so that the tar components are prevented from sticking within the discharge lead portion 7A and the discharge gas lead portion 7B or the charcoal are prevented from slicking thereto to prevent the blockage to discharge the high quality smoke.

According to the present invention as described above, there is provided a novel fish processing method using a smoking liquid into which a smoke component is dissolved. A so-called smoke (smoke dry component) is liquefied and this smoking liquid is applied to fish so that the manufacture of products which are similar to the smoke dried products is performed. Accordingly, without performing the difficult smoke dry process, for example, only with a simple dipping work, it is possible to produce the products which are similar to those processed through the smoke dry. In addition, since this liquid contains not only the good fragrance but also the smoke dry component of the liquid and gas, it is possible to exhibit the effect, such as preservation, which is similar to that of the smoke dry process. By using the smoking liquid that is superior in mass production and easy to handle, it is possible and easy to handle the smoke dried product which has been conventionally difficult to handle and has a disadvantage in mass production. As a result, for example, it is possible to transport the tuna from the worldwide sites to Japan under the frozen condition at −18° C. without keeping the tuna in the round condition or only the edible part thereof at −60° C. or less. If such a process is effected, it is possible to reduce the consumed energy, which is needed to freeze or preserve the product, down to 1/80 and an extremely remarkable energy saving may be expected.

Also, according to the second aspect of the invention, it is possible to produce a much simpler smoke dried product, and also, according to the third to sixth aspects of the invention, it is possible to provide a more excellent fish processing method using a smoking liquid into which the smoke component is dissolved, in which, for example, the smoke process may be performed together with the conventional perfusion process proposed by the present assignee.

Also, according to the seventh to seventeenth aspects of the invention, it is possible to provide a fish processing method using a smoking liquid into which the smoke component is dissolved, which is extremely superior in practical use and which exhibits the resultant effects of the invention without fail with a much simpler structure.

What is claimed is:

1. A fish processing method comprising generating a smoking material from a smoke generating device, into which no air is introduced from a cast portion for feeding the smoke material and smoke discharge path, removing at least one unnecessary substance selected from the group consisting of soot and tar from the smoking material under a condition where air is interrupted or air is not introduced, bringing, at a normal pressure or a pressurized condition, the smoking material into contact or into mixing contact by a mixer with at least one of water, a solution or a solution comprising at least one additive selected from the group consisting of an antioxidant, a pH adjuster and a condiment to dissolve a smoke dry component to form a smoking liquid, and applying the smoking liquid to a fish to produce a smoke dried product, wherein the smoking liquid is dispersed into fish meat through a blood vessel as a perfusate to thereby apply the smoking liquid to the fish meat.

2. The fish processing method as defined in claim 1, wherein after the smoking liquid is caused to pass through a filter to thereby remove a fine solid substance, the smoking liquid is used as a perfusate and dispersed into a fish meat to apply the smoking liquid to the fish meat.

3. The fish processing method as defined in claim 2, wherein the smoking component is dispersed into a meat of a large size fish under a round condition such as a tuna and a sword fish.

4. The fish processing method as defined in any one of claims 1 to 3, wherein the smoke dried product to which the smoking liquid is applied is frozen.

5. The fish processing method as defined in claim 1, wherein the smoking component is dispersed into a meat of a large size fish under a round condition such as a tuna and a sword fish.

6. The fish processing method as defined in any one of claims 1 to 3, wherein after a first perfusate containing a component that prevent the blood from coagulating for flowing a blood through a blood vessel of the fish is pressurized to flow out and discharge the blood, the smoking liquid is dispersed, as the perfusate to be fed thereafter, into a fish meat through the blood vessel to thereby apply the smoking component over the fish meat to produce a smoke dried product.

7. The fish processing method as defined in claim 6, wherein after a first perfusate containing a component that prevent the blood from coagulating for flowing a blood through a blood vessel of the fish is pressurized to flow out and discharge the blood, the smoking liquid containing a component in conformity with a purpose of anti-oxidation and taste improvement is dispersed, as a second perfusate, into a fish meat through the blood vessel to thereby apply the smoking component over the fish meat to produce a smoke dried product.

8. The fish processing method as defined in claim 7, wherein the smoke dried product to which the smoking liquid is applied is frozen.

9. The fish processing method as defined in claim 6, wherein the smoke dried product to which the smoking liquid is applied is frozen.

* * * * *